United States Patent
Xue

(10) Patent No.: US 9,986,055 B2
(45) Date of Patent: May 29, 2018

(54) PAGE UPDATE REMINDING METHOD, SYSTEM, AND DEVICE

(75) Inventor: Jingjing Xue, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 202 days.

(21) Appl. No.: 14/402,082

(22) PCT Filed: Aug. 7, 2012

(86) PCT No.: PCT/CN2012/079758
§ 371 (c)(1),
(2), (4) Date: Nov. 18, 2014

(87) PCT Pub. No.: WO2014/005364
PCT Pub. Date: Jan. 9, 2014

(65) Prior Publication Data
US 2015/0127718 A1    May 7, 2015

(30) Foreign Application Priority Data
Jul. 3, 2012 (CN) .......................... 2012 1 0229408

(51) Int. Cl.
*G06F 15/16* (2006.01)
*H04L 29/08* (2006.01)
*G06F 17/22* (2006.01)

(52) U.S. Cl.
CPC .......... *H04L 67/28* (2013.01); *G06F 17/2247* (2013.01); *H04L 67/26* (2013.01); *H04L 67/2804* (2013.01); *H04L 67/22* (2013.01)

(58) Field of Classification Search
CPC ..... G06F 17/2247; H04L 67/26; H04L 67/28; H04L 67/2804
USPC ............... 709/201, 202, 203, 217, 219, 248
See application file for complete search history.

(56) References Cited

U.S. PATENT DOCUMENTS

| 6,834,306 B1 * | 12/2004 | Tsimelzon ........ G06F 17/30905 707/E17.116 |
| 7,209,944 B2 | 4/2007 | Ogasawara |
| 2009/0112890 A1 | 4/2009 | Medi et al. |
| 2010/0312788 A1 * | 12/2010 | Bailey ............... G06F 17/30637 707/769 |

(Continued)

FOREIGN PATENT DOCUMENTS

| CN | 1841381 | 10/2006 |
| CN | 1959679 | 5/2007 |

(Continued)

*Primary Examiner* — Davoud Zand
(74) *Attorney, Agent, or Firm* — Hodgson Russ LLP

(57) ABSTRACT

A method for reminding a page update is provided. The method includes: receiving by a proxy server a request from a user for visiting a page of a third-party website via a mobile terminal; obtaining by the proxy server the page of the third-party website according to the request and providing by the proxy server the page to the mobile terminal; entering by the mobile terminal an update reminding markup state after receiving an instruction of the user; receiving and marking by the mobile terminal a region selected by the user in the page and feeding back the selected region to the proxy server; and notifying by the proxy server the user in a predetermined manner when content in the selected region of the page is updated.

14 Claims, 2 Drawing Sheets

(56) References Cited

U.S. PATENT DOCUMENTS

| | | | | |
|---|---|---|---|---|
| 2011/0211813 A1* | 9/2011 | Marks | G06F 17/3089 | 386/297 |
| 2012/0016655 A1* | 1/2012 | Travieso | G06F 17/2827 | 704/2 |
| 2012/0078727 A1* | 3/2012 | Lee | G06Q 30/02 | 705/14.66 |
| 2012/0084151 A1* | 4/2012 | Kozak | G06Q 30/02 | 705/14.58 |
| 2012/0084348 A1* | 4/2012 | Lee | G06Q 30/02 | 709/203 |
| 2012/0084349 A1* | 4/2012 | Lee | G06Q 30/02 | 709/203 |
| 2013/0031453 A1* | 1/2013 | Griffiths | G06F 17/2247 | 715/230 |
| 2013/0031454 A1* | 1/2013 | Griffiths | G06F 17/2247 | 715/230 |
| 2013/0031455 A1* | 1/2013 | Griffiths | G06F 17/2247 | 715/230 |
| 2013/0031457 A1* | 1/2013 | Griffiths | G06F 17/241 | 715/231 |
| 2013/0073387 A1* | 3/2013 | Heath | G06Q 50/01 | 705/14.53 |
| 2013/0073389 A1* | 3/2013 | Heath | G06Q 50/01 | 705/14.54 |
| 2013/0073400 A1* | 3/2013 | Heath | G06Q 30/02 | 705/14.73 |
| 2013/0117645 A1* | 5/2013 | Butlin | G06F 17/3089 | 715/205 |

FOREIGN PATENT DOCUMENTS

| | | |
|---|---|---|
| CN | 101296255 | 10/2008 |
| CN | 101938525 | 1/2011 |
| CN | 102236709 | 11/2011 |
| EP | 0996266 | 4/2000 |

\* cited by examiner

PAGE UPDATE REMINDING METHOD, SYSTEM, AND DEVICE

CROSS REFERENCE TO RELATED APPLICATION

This U.S. application claims priority under 35 U.S.C 371 to, and is a U.S. National Phase application of, the International Patent Application No. PCT/CN2012/079758, filed Aug. 7, 2012, which claims the benefit of prior Chinese Application No. 201210229408.7 filed Jul. 3, 2012. The entire contents of the before-mentioned patent applications are incorporated by reference as part of the disclosure of this U.S. application.

FIELD

Embodiments of the present disclosure generally relate to a computer technology, and more particularly, to a method, a system and an apparatus for reminding a page update.

BACKGROUND

Currently, most users visit a page in a manner that the user sends a request initiatively, and a server responds to the request passively, such that if the user wants to obtain a feedback of the server to obtain the information that he needs, he must send the request first. If the user wants to track a change of the information, a manual inspection shall be performed continuously, thus wasting a lot of time and effort. The user cannot be notified after the server is updated, such that the page content update cannot be realized by the user timely, thus resulting in a poor user experience. Moreover, since what are focused by the users are greatly different from each other, it is required to browse and compare the whole page each time, thus wasting a lot of sources and time and resulting in a low efficiency.

SUMMARY

Embodiments of the present disclosure seek to solve at least one of the problems existing in the related art to at least some extent.

Accordingly, a first objective of the present disclosure is to provide a method for reminding a page update, which can push an update information to a user initiatively and subdivide the page so as to mark out more accurate user focuses, thus saving time and effort and obtaining a better user experience.

A second objective of the present disclosure is to provide a page update reminding system.

A third objective of the present disclosure is to provide a proxy server.

A fourth objective of the present disclosure is to provide a mobile terminal.

In order to achieve above objectives, embodiments of a first aspect of the present disclosure provide a method for reminding a page update, including: receiving by a proxy server a request from a user for visiting a page of a third-party website via a mobile terminal; obtaining by the proxy server the page of the third-party website according to the request and providing by the proxy server the page to the mobile terminal; entering by the mobile terminal an update reminding markup state after receiving an instruction of the user; receiving and marking by the mobile terminal a region selected by the user in the page and feeding back the selected region to the proxy server; and notifying by the proxy server the user in a predetermined manner when content of the selected region of the page is updated.

With the method for reminding the page update according to embodiments of the present disclosure, by pushing the update information initiatively, the user can obtain the latest information timely, which saves time and effort of the user and also saves the data flow of the mobile terminal. Moreover, by subdividing the page by means of a module division method, a focus accuracy of the user is improved, and thus a better user experience is provided. Furthermore, what is required to be reminded in embodiments of the present disclosure is completely selected by the user independently, and thus a stronger universality is provided.

In an embodiment of the present disclosure, notifying by the proxy server the user in a predetermined manner when content of the selected region of the page is updated includes: analyzing by the proxy server a current page to obtain a plurality of content blocks in the current page; determining by the proxy server at least one content block belonging to the selected region according to the selected region; obtaining content of the at least one content block and recording the content as initial content by the proxy server; crawling by the proxy server the page corresponding to the third-party website and determining whether the update exists in the content of the at least one content block with respect to the initial content; and notifying by the proxy server the user in the predetermined manner when it is determined that the update exists.

In an embodiment of the present disclosure, the method for reminding the page update further includes: obtaining updated content of the at least one content block and sending the updated content to the user by the proxy server.

In an embodiment of the present disclosure, the mobile terminal marks the selected region in the page using a XPATH language.

In an embodiment of the present disclosure, the predetermined manner comprises one or more of a mail, a text message and a multimedia message. With a variety of notification ways, the user can receive the update information timely.

In an embodiment of the present disclosure, the proxy server crawls the page corresponding to the third-party website periodically or obtains the page corresponding to the third-party website when a search engine system crawls the page corresponding to the third-party website.

Embodiments of a second aspect of the present disclosure provide a page update reminding system, including a mobile terminal and a proxy server. The mobile terminal is configured to send a request of visiting a page of a third-party website, to receive a region selected by a user in the page after entering an update reminding markup state and to feed back the selected region to the proxy server; the proxy server is configured to receive the request, to obtain the page of the third-party website according to the request, to provide the page to the mobile terminal and to notify the user in a predetermined manner when content of the selected region of the page is updated.

With the page update reminding system according to embodiments of the present disclosure, by pushing the update information initiatively, the user can obtain the latest information timely, which saves time and effort of the user and also saves the data flow of the mobile terminal. Moreover, by subdividing the page by means of a module division method, a focus accuracy of the user is improved, and thus a better user experience is provided. Furthermore, what is required to be reminded in embodiments of the present disclosure is completely selected by the user independently, and thus a stronger universality is provided.

In an embodiment of the present disclosure, the proxy server is configured to analyze a current page to obtain a plurality of content blocks in the current page, to determine at least one content block belonging to the selected region according to the selected region, to obtain content of the at least one content block and record the content as initial content and to notify the user in the predetermined manner when it is determined that the update exists.

In an embodiment of the present disclosure, the proxy server is further configured to obtain updated content of the at least one content block and to send the updated content to the user.

In an embodiment of the present disclosure, the mobile terminal marks the selected region in the page using a XPATH language.

In an embodiment of the present disclosure, the predetermined manner comprises one or more of a mail, a text message and a multimedia message.

In an embodiment of the present disclosure, the proxy server crawls the page corresponding to the third-party website periodically or obtains the page corresponding to the third-party website when a search engine system crawls the page corresponding to the third-party website.

Embodiments of a third aspect of the present disclosure provide a proxy server, including: a crawling module configured to receive a request from a user for visiting a page of a third-party website via a mobile terminal, to obtain the page of the third-party website according to the request and to provide the page to the mobile terminal; a receiving module configured to receive a region selected by the user in the page and sent from the mobile terminal; an analyzing module configured to determine whether content of the selected region is updated; and a notifying module configured to notify the user in a predetermined manner when the analyzing module determines that the content of the selected region of the page is updated.

In an embodiment of the present disclosure, the analyzing module includes: a content block dividing unit configured to analyze a current page so as to obtain a plurality of content blocks in the current page; a content analyzing unit configured to determine at least one content block belonging to the selected region according to the selected region, to obtain content of the at least one content block and to record the content as initial content; and an update determining unit configured to catch the page corresponding to the third-party website and to determine whether the update exists in the content of the at least one content block with respect to the initial content.

In an embodiment of the present disclosure, the analyzing module is further configured to obtain updated content of the at least one content block and to send the updated content to the user via the notifying module.

Embodiments of a fourth aspect of the present disclosure provide a mobile terminal, including: a sending module configured to send a request of visiting a page of a third-party website; and a marking module configured to receive a region selected by a user in the page after entering an update reminding markup state, to feed back the selected region to a proxy server, such that the proxy server notifies the user in a predetermined manner when content of the selected region of the page is updated.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
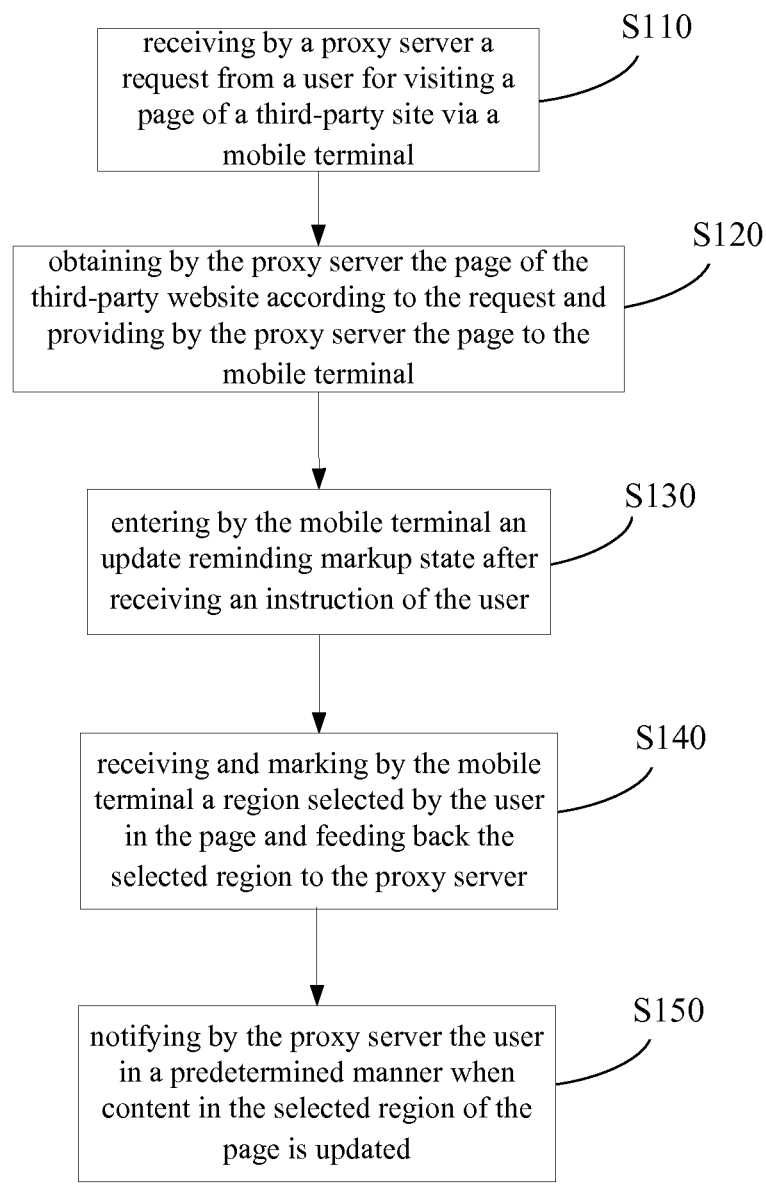
FIG. 1 is a flow chart of a method for reminding a page update according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

A method for reminding a page update according to embodiments of the present disclosure will be described in the following with reference to FIG. 1. The method includes following steps.

At step S110, a proxy server receives a request from a user for visiting a page of a third-party website via a mobile terminal. In embodiments of the present disclosure, the mobile terminal may be any portable mobile device, such as a mobile phone, a personal digital assistant and a tablet PC.

For example, the third-party website visited by the user via the mobile terminal may be recorded as a, and the proxy server receives the request of visiting the third-party website a. It can be understood that the above third-party website a is intended to be exemplary and embodiments of the present disclosure shall not be limited to this.

At step S120, the proxy server obtains the page of the third-party website according to the request and provides the page to the mobile terminal.

For example, the proxy server obtains the page of the third-party website a according to an address of the third-party website a and returns the page of the third-party website a to the mobile terminal. In the step, the page of the third-party website is a current page which may be changed over time in subsequent description, and the change thereof may be a change of the whole page or a change of partial content of the page.

At step S130, the mobile terminal enters an update reminding markup state after receiving an instruction of the user.

For example, the user inputs the instruction of updating the reminding markup, and the mobile terminal enters the update reminding markup state. It can be understood that the above action that the user inputs the instruction of updating the reminding markup is just intended to be exemplary, and embodiments of the present disclosure shall not be limited to this. In embodiments of the present disclosure, this function may be embedded into a browser of the mobile terminal, and when the user clicks a update reminding markup button, the browser enters the update reminding markup state automatically and provides a selecting interface to the user, such that the user can select a region that he is interested in in the selecting interface. When content of the region that the user is interested in is updated, the proxy server will remind the user timely.

At step S140, the mobile terminal receives and marks the region selected by the user in the page and feeds back the selected region to the proxy server. In embodiments of the present disclosure, after entering the update reminding markup state, the mobile terminal may record a track input by the user on the touch screen thereof. When the track satisfies a certain requirement such as a size requirement and the track is a closed track or a nearly closed track, it is determined that a region corresponding to the track is the region selected by the user in the page.

In an embodiment of the present disclosure, the mobile terminal may mark the selected region in the page using a XPATH language. For example, the user selects a notice board in the page, and the mobile terminal feeds back a region of the notice board selected by the user to the proxy server. It can be understood that the above notice board is just intended to be exemplary, and embodiments of the present disclosure shall not be limited to this.

At step S150, the proxy server notifies the user in a predetermined manner when content of the selected region of the page is updated.

Notifying by the proxy server the user in a predetermined manner when content of the selected region of the page is updated further includes following steps.

At step S151, the proxy server analyzes the current page to obtain a plurality of content blocks in the current page.

At step S152, the proxy server determines at least one content block belonging to the selected region according to the selected region. In embodiments of the present disclosure, the region selected by the user may include a content block in which he hopes a update notice is included, may also include other content blocks, or may include a part of the other content blocks (i.e., this region does not cover this content block completely). Therefore, it is required to further select the content blocks contained in the region, for example by determining a type, a property or content of the content block, so as to remove the content blocks in type of advertisements. Alternatively, if this region just covers a part of the content block, it is considerable to filter the content block.

At step S153, the proxy server obtains content of the at least one content block and records the content as initial content.

In an embodiment of the present disclosure, the content of this content block may be text content or multimedia content such as audio content or an advertisement. Therefore, the present disclosure may be used for reminding a content update of any type of webpages, for example for a forum webpage, the user can receive a reminding when a new comment appears, or for a shopping webpage, the user can receiving a reminding when a price changes, and so on. It completely depends on the user to determine to receive a reminding when what kind of content is updated, which facilitates the user's selection dramatically and improves a usage satisfaction of the user.

At step S154, the proxy server crawls the page corresponding to the third-party website and determines whether the update exists in the content of the at least one content block with respect to the initial content. In an embodiment of the present disclosure, the proxy server crawls the page corresponding to the third-party website periodically or obtains the page corresponding to the third-party website when a search engine system crawls the page corresponding to the third-party website, or obtains the page corresponding to the third-party website in other manners.

At step S155, the proxy server notifies the user in the predetermined manner when it is determined that the update exists. The proxy server obtains updated content of the at least one content block and sends the updated content to the user. The predetermined manner includes one or more of a mail, a text message and a multimedia message.

For example, the proxy server analyzes the page of the third-party website a to obtain content blocks of the page a, and determines the content blocks belonging to the selected region according to the selected region and records the content of these content blocks as the initial content. The proxy server crawls the page of the third-party website every 10 seconds, and compares a content block in the notice board region selected by the user in the obtained page of the third-party website a with the initial content saved in the proxy server. If the content of the content block is changed, the proxy server determines that the update exists and sends a mail or a text message to notify the user.

In other embodiments of the present disclosure, apart from notifying the user, the proxy server can also obtain the updated content, add the updated content to an update notification, and send the update notification with the updated content to the user, for example via the text message or the mail. Therefore, the user can obtain the updated content without landing the page, thus further improving the satisfaction of the user. Moreover, what is required to be reminded in embodiments of the present disclosure is completely selected by the user independently, and thus a stronger universality is provided.

With the method for reminding the page update according to embodiments of the present disclosure, by pushing the update information initiatively, the user can obtain the latest information timely, which saves time and effort of the user. Moreover, by subdividing the page by means of a module division method, a focus accuracy of the user is improved, and thus a better user experience is provided.

Figure 2:
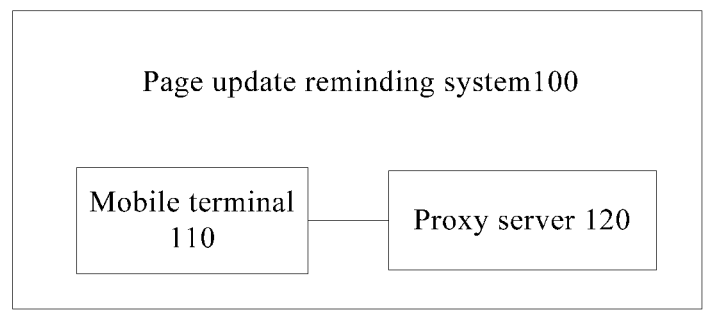
FIG. 2 is a schematic diagram of a page update reminding system according to an embodiment of the present disclosure.

A page update reminding system 100 according to embodiments of the present disclosure will be described in the following with reference to FIG. 2. The system 100 includes a mobile terminal 110 and a proxy server 120. The mobile terminal 110 is configured to send a request of visiting a page of a third-party website, to receive a region selected by a user in the page after entering an update reminding markup state and to feed back the selected region to the proxy server. In embodiments of the present disclosure, the mobile terminal 110 may be any portable mobile device, such as a mobile phone, a personal digital assistant and a tablet PC. The proxy server 120 is configured to receive the request sent from the mobile terminal 110, to obtain the page of the third-party website according to the request, to provide the page to the mobile terminal 110 and to notify the user in a predetermined manner when content of the selected region of the page is updated, for example via a mail, a text message or a multimedia message.

The mobile terminal 110 marks the selected region in the page using a XPATH language. In embodiments of the present disclosure, this function may be embedded into a browser of the mobile terminal 110, and when the user clicks a update reminding markup button, the browser enters the update reminding markup state automatically and provides a selecting interface to the user, such that the user can select a region that he is interested in in the selecting interface.

When content of the region that the user is interested in is updated, the proxy server 120 will remind the user timely. In embodiments of the present disclosure, after entering the update reminding markup state, the mobile terminal 110 may record a track input by the user on a touch screen. When the track satisfies a certain requirement such as a size requirement and the track is closed or nearly closed, it is determined that a region corresponding to the track is the region selected by the user in the page.

Specifically, the proxy server 120 analyzes a current page to obtain a plurality of content blocks in the current page first, and then determines at least one content block belonging to the selected region according to the selected region, and records content of the at least one content block as initial content. When the update exists in the content of the at least one content block with respect to the initial content, the proxy server 120 notifies the user in the predetermined manner. The proxy server 120 crawls the page corresponding to the third-party website periodically or obtains the page corresponding to the third-party website when a search engine system crawls the page corresponding to the third-party website. The proxy server 120 is further configured to obtain updated content of the at least one content block and to send the updated content to the user. The predetermined manner includes one or more of a mail, a text message and a multimedia message.

For example, the third-party website visited by the mobile terminal 110 is recorded as a, and the user inputs an instruction of updating the reminding markup and then the mobile terminal 110 enters the update reminding markup state. The user selects a notice board in the page, and the mobile terminal 110 feeds a region of the notice board selected by the user back to the proxy server.

The proxy server 120 obtains a page of the third-party website a according to an address of the third-party website a, and returns the page of the third-party website a to the mobile terminal 110. The proxy server 120 analyzes the page of the third-party website a to obtain a content block in the page, and determines the content block belonging to the selected region according to the selected region and records content of the content block as initial content. The proxy server 120 crawls the page of the third-party website every 10 seconds, and compares a content block in the notice board region selected by the user in the obtained page of the third-party website a with the initial content saved in the proxy server 120. If the content of the content block is changed, the proxy server 120 determines that the update exists and sends a mail or a text message to notify the user.

Figure 3:
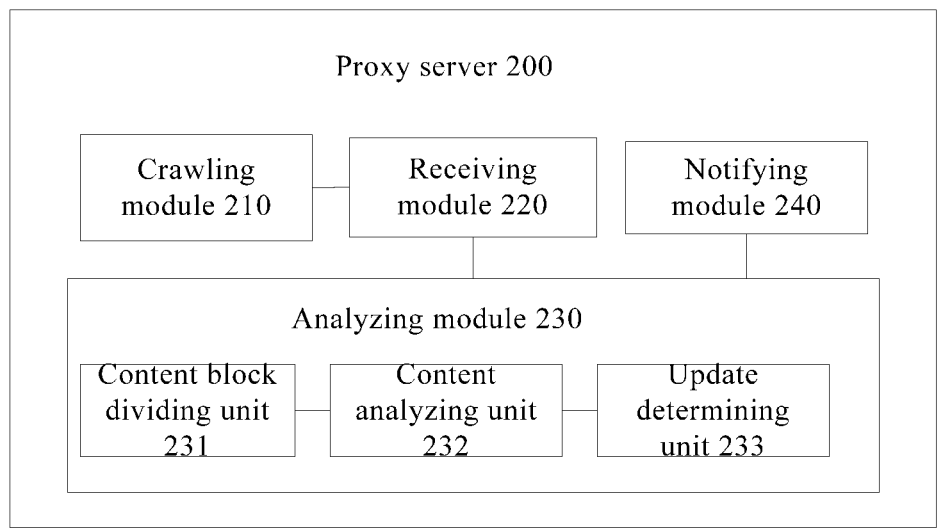
FIG. 3 is a schematic diagram of a proxy server according to an embodiment of the present disclosure.

A proxy server 200 according to embodiments of the present disclosure will be described in the following with reference to FIG. 3. The proxy server 200 includes a crawling module 210, a receiving module 220, an analyzing module 230 and a notifying module 240. The crawling module 210 is configured to receive a request from a user for visiting a page of a third-party website via a mobile terminal, to obtain the page of the third-party website according to the request and to provide the page to the mobile terminal. The receiving module 220 is configured to receive a region selected by the user in the page and sent from the mobile terminal. The analyzing module 230 is configured to determine whether content of the selected region is updated. The notifying module 240 is configured to notify the user in a predetermined manner when the analyzing module determines that the content of the selected region of the page is updated.

The analyzing module 230 further includes a content block dividing unit 231, a content analyzing unit 232 and an update determining unit 233. The content block dividing unit 231 is configured to analyze a current page so as to obtain a plurality of content blocks in the current page. The content analyzing unit 232 is configured to determine at least one content block belonging to the selected region according to the selected region, to obtain content of the at least one content block and to record the content as initial content. The update determining unit 233 is configured to catch the page corresponding to the third-party website and to determine whether the update exists in the content of the at least one content block with respect to the initial content.

The analyzing module 230 is further configured to obtain updated content of the at least one content block and to send the updated content to the user via the notifying module.

The mobile terminal marks the selected region in the page using a XPATH language.

The predetermined manner used in the notifying module 240 includes one or more of a mail, a text message and a multimedia message.

Figure 4:
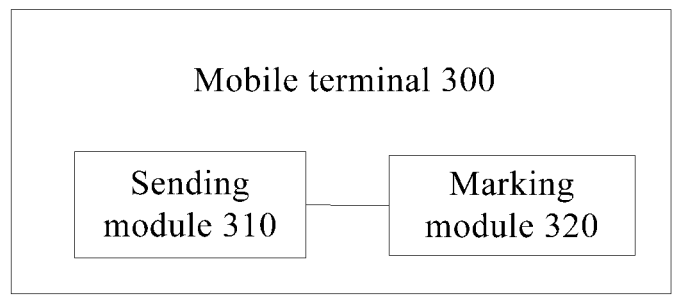
FIG. 4 is a schematic diagram of a mobile terminal according to an embodiment of the present disclosure.

A mobile terminal 300 according to embodiments of the present disclosure will be described in the following with reference to FIG. 4. The mobile terminal 300 includes a sending module 310 and a marking module 320. The sending module 310 is configured to send a request of visiting a page of a third-party website. The marking module 320 is configured to receive a region selected by a user in the page after entering an update reminding markup state, to feed back the selected region to a proxy server, such that the proxy server notifies the user in a predetermined manner when content of the selected region of the page is updated.

In an embodiment of the present disclosure, the marking module 320 marks the selected region in the page using a XPATH language. The predetermined manner includes one or more of a mail, a text message and a multimedia message.

With the page update reminding system according to embodiments of the present disclosure, by pushing the update information initiatively, the user can obtain the latest information timely, which saves time and effort of the user and also saves the data flow of the mobile terminal. Moreover, by subdividing the page by means of a module division method, a focus accuracy of the user is improved, and thus a better user experience is provided. Furthermore, what is required to be reminded in embodiments of the present disclosure is completely selected by the user independently, and thus a stronger universality is provided.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for reminding a page update, comprising:
   receiving by a proxy server a request from a user for visiting a page of a third-party website via a mobile terminal;
   obtaining by the proxy server the page of the third-party website according to the request and providing by the proxy server the page to the mobile terminal;
   entering by the mobile terminal an update reminding markup state after receiving an instruction of the user;
   receiving and marking by the mobile terminal a region selected by the user in the page and feeding back the selected region to the proxy server;
   notifying by the proxy server the user in a predetermined manner when content in the selected region of the page is updated; and
   wherein selection-enabling functionality is embedded in a browser of the mobile terminal, and when the user clicks an update reminding markup button, the browser enters the update reminding markup state automatically and provides a selection interface to the user, such that the user can select a region that the user is interested in in the selecting interface.

2. The method according to claim 1, wherein notifying by the proxy server the user in a predetermined manner when content of the selected region of the page is updated comprises:
   analyzing by the proxy server a current page to obtain a plurality of content blocks in the current page;
   determining by the proxy server at least one content block belonging to the selected region according to the selected region;
   obtaining content of the at least one content block and recording the content as initial content by the proxy server;
   crawling by the proxy server the page corresponding to the third-party website and determining whether the update exists in the content of the at least one content block with respect to the initial content; and
   notifying by the proxy server the user in the predetermined manner when it is determined that the update exists.

3. The method according to claim 2, further comprising:
   obtaining updated content of the at least one content block and sending the updated content to the user by the proxy server.

4. The method according to claim 1, wherein the mobile terminal marks the selected region in the page using a XPATH language.

5. The method according to claim 1, wherein the predetermined manner comprises one or more of a mail, a text message and a multimedia message.

6. The method according to claim 1, wherein the proxy server crawls the page corresponding to the third-party website periodically or obtains the page corresponding to the third-party website when a search engine system crawls the page corresponding to the third-party website.

7. A proxy server, comprising:
   one or more processors configured to execute the following software modules located on a non-transitory computer-readable medium:
      a crawling module configured to receive a request from a user for visiting a page of a third-party website via a mobile terminal, to obtain the page of the third-party website according to the request and to provide the page to the mobile terminal;
      a receiving module configured to receive a region selected by the user in the page and sent from the mobile terminal wherein selection-enabling functionality is embedded in a browser of the mobile terminal, and when the user clicks an update reminding markup button, the browser enters the update reminding markup state automatically and provides a selection interface to the user, such that the user can select a region that the user is interested in in the selecting interface;
      an analyzing module configured to determine whether content of the selected region is updated; and
      a notifying module configured to notify the user in a predetermined manner when the analyzing module determines that the content of the selected region of the page is updated.

8. The proxy server according to claim 7, wherein the analyzing module comprises:
   a content block dividing unit configured to analyze a current page so as to obtain a plurality of content blocks in the current page;
   a content analyzing unit configured to determine at least one content block belonging to the selected region according to the selected region, to obtain content of the at least one content block and to record the content as initial content; and
   an update determining unit configured to catch the page corresponding to the third-party website and to determine whether the update exists in the content of the at least one content block with respect to the initial content.

9. The proxy server according to claim 7, wherein the analyzing module is further configured to obtain updated content of the at least one content block and to send the updated content to the user via the notifying module.

10. The proxy server according to claim 7, wherein the mobile terminal marks the selected region in the page using a XPATH language.

11. The proxy server according to claim 7, wherein the predetermined manner comprises one or more of a mail, a text message and a multimedia message.

12. A mobile terminal, comprising:
    one or more processors configured to execute the following software modules located on a non-transitory computer-readable medium:
       a sending module configured to send a request of visiting a page of a third-party website; and
       a marking module configured to receive a region selected by a user in the page after entering an update reminding markup state, to feed back the selected region to a proxy server, such that the proxy server notifies the user in a predetermined manner when content of the selected region of the page is updated; and
    wherein selection-enabling functionality is embedded in a browser of the mobile terminal, and when the user clicks an update reminding markup button, the browser enters the update reminding markup state automatically and provides a selection interface to the user, such that the user can select a region that the user is interested in in the selecting interface.

13. The mobile terminal according to claim 12, wherein the marking module marks the selected region in the page using a XPATH language.

14. The mobile terminal according to claim 12, wherein the predetermined manner comprises one or more of a mail, a text message and a multimedia message.

\* \* \* \* \*